US012802637B2

(12) United States Patent
Kim et al.

(10) Patent No.: US 12,802,637 B2
(45) Date of Patent: Nov. 17, 2026

(54) PIXEL CIRCUIT, DISPLAY DEVICE INCLUDING THE SAME, AND ELECTRONIC DEVICE INCLUDING THE DISPLAY DEVICE

(71) Applicant: Samsung Display Co., LTD., Yongin-si (KR)

(72) Inventors: Kwihyun Kim, Yongin-si (KR); Dongwoo Kim, Yongin-si (KR); Sehyun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/037,753

(22) Filed: Jan. 27, 2025

(65) Prior Publication Data

US 2025/0342804 A1 Nov. 6, 2025

(30) Foreign Application Priority Data

May 2, 2024 (KR) ........................ 10-2024-0058549

(51) Int. Cl.
*G09G 3/3233* (2016.01)

(52) U.S. Cl.
CPC ... *G09G 3/3233* (2013.01); *G09G 2300/0426* (2013.01); *G09G 2310/0272* (2013.01)

(58) Field of Classification Search
CPC ....... H10K 59/00–95; G09G 2320/064; G09G 2320/0633; G09G 3/3241; G09G 3/3291; G09G 3/32; G09G 2300/0861; G09G 2300/0852; G09G 2300/0819
See application file for complete search history.

(56) References Cited

U.S. PATENT DOCUMENTS

2020/0111403 A1* 4/2020 Kim ..................... G09G 3/2011
2021/0210003 A1* 7/2021 Kim ..................... G09G 3/2014
2023/0267882 A1* 8/2023 Yang .................... G09G 3/3233

FOREIGN PATENT DOCUMENTS

KR 10-2021-0087873 7/2021
KR 10-2021-0131852 11/2021
KR 10-2022-0052265 4/2022
KR 10-2023-0127383 9/2023

* cited by examiner

*Primary Examiner* — Sanjiv D. Patel
(74) *Attorney, Agent, or Firm* — Womble Bond Dickinson (US) LLP

(57) ABSTRACT

A pixel circuit includes a light emitting element, a CCG circuit, and a PWM circuit. The CCG circuit includes a seventh transistor including a gate electrode connected to a fourth node, a first electrode configured to receive a second high power supply voltage, and a second electrode connected to a fifth node, an eighth transistor including a gate electrode configured to receive a second write gate signal, a first electrode receiving a data voltage, and a second electrode connected to a sixth node, and a second capacitor including a first electrode connected to the sixth node and a second electrode connected to the fourth node.

18 Claims, 14 Drawing Sheets

PIXEL CIRCUIT, DISPLAY DEVICE INCLUDING THE SAME, AND ELECTRONIC DEVICE INCLUDING THE DISPLAY DEVICE

CROSS-REFERENCE TO RELATED APPLICATION

The present application claims priority to and the benefit of Korean Patent Application No. 10-2024-0058549, filed on May 2, 2024, in the Korean Intellectual Property Office, the entire disclosure of which is incorporated by reference herein.

BACKGROUND

1. Field

The present disclosure relates to a pixel circuit, a display device including the same, and an electronic device including the display device. More particularly, the present disclosure relates to a pixel circuit and a display device including the same for driving a light emitting element using a pulse width modulation (PWM) method.

2. Description of the Related Art

A method of driving a light emitting element such as a micro light emitting diode (uLED), an organic light emitting diode (OLED), etc. may include a pulse amplitude modulation (PAM) method and a pulse width modulation (PWM) method. In the PAM method, an amount (or an amplitude) of a driving current provided to the light emitting element may be adjusted to express the brightness. On the other hand, in the PWM method, a time (or a pulse width) of the driving current provided to the light emitting element may be adjusted to express the brightness.

The light emitting element such as the micro light emitting diode may have a characteristic in which a wavelength of light shifts according to an amount of the driving current. Therefore, when the light emitting element such as the micro light emitting diode is driven by the PAM method, a color shift phenomenon may be generated and an image may be distorted.

SUMMARY

Embodiments of the present disclosure provide a pixel circuit for providing an improved image quality.

Embodiments of the present disclosure provide a display device including the pixel circuit.

In one or more embodiments, a pixel circuit includes a light emitting element, a constant current generation (CCG) circuit configured to generate a fixed driving current based on a CCG data voltage of a data voltage, a second high power voltage, and a low power voltage to provide the fixed driving current to the light emitting element, and a pulse width modulation (PWM) circuit configured to control a generation time of the fixed driving current based on a PWM data voltage of the data voltage, a sweep voltage, a first high power voltage different from the second high power voltage, and a low power voltage. The PWM circuit includes a first transistor including a gate electrode connected to a first node, a first electrode connected to a second node, and a second electrode connected to a third node, a second transistor including a gate electrode configured to receive a first write gate signal, a first electrode configured to receive the data voltage, and a second electrode connected to the second node, and a first capacitor including a first electrode configured to receive a swing voltage and a second electrode connected to the first node. The CCG circuit includes a seventh transistor including a gate electrode connected to a fourth node, a first electrode configured to receive the second high power voltage, and a second electrode connected to a fifth node, an eighth transistor including a gate electrode configured to receive a second write gate signal, a first electrode configured to receive the data voltage, and a second electrode connected to a sixth node, and a second capacitor including a first electrode connected to the sixth node and a second electrode connected to the fourth node.

In one or more embodiments, the CCG circuit may further include a third capacitor including a first electrode configured to receive the second high power voltage and a second electrode connected to the sixth node.

In one or more embodiments, the CCG circuit may further include a ninth transistor including a gate electrode configured to receive a compensation gate signal, a first electrode connected to the fifth node, and a second electrode connected to the fourth node.

In one or more embodiments, the CCG circuit may further include an eleventh transistor including a gate electrode configured to receive a second initialization gate signal, a first electrode configured to receive an initialization voltage, and a second electrode connected to the fourth node.

In one or more embodiments, the light emitting element may include an anode connected to the CCG circuit and a cathode configured to receive the low power voltage. The CCG circuit may further include a twelfth transistor including a gate electrode configured to receive an anode initialization gate signal, a first electrode configured to receive an anode initialization voltage, and a second electrode connected to the anode of the light emitting element.

In one or more embodiments, the seventh transistor and the twelfth transistor are P-type transistors, and the eighth transistor, the ninth transistor, and the eleventh transistor are N-type transistors.

In one or more embodiments, the seventh to ninth transistors, the eleventh transistor, and the twelfth transistor may be P-type transistors.

In one or more embodiments, the compensation gate signal, the second write gate signal, and the second initialization gate signal may be global scan signals.

In one or more embodiments, the CCG circuit may further include a tenth transistor connected between the fifth node and the anode of the light emitting element and turned on in response to an emission signal.

In one or more embodiments, the CCG circuit may further include a tenth transistor configured to receive the second high power voltage and connected to the first electrode of the seventh transistor, and turned on in response to an emission signal.

In one or more embodiments, the PWM circuit may further include a third transistor including a gate electrode configured to receive the first write gate signal, a first electrode connected to the third node, and a second electrode connected to the first node.

In one or more embodiments, the PWM circuit may further include a sixth transistor including a gate electrode configured to receive a first initialization gate signal, a first electrode configured to receive an initialization voltage, and a second electrode connected to the first node.

In one or more embodiments, the PWM circuit may further include a fourth transistor including a gate electrode configured to receive an emission signal, a first electrode configured to receive the first high power voltage, and a second electrode connected to the second node, and a fifth transistor including a gate electrode configured to receive the emission signal, a first electrode connected to the third node, and a second electrode connected to the fourth node.

In one or more embodiments, the first transistor, the fourth transistor, and the fifth transistor may be P-type transistors, and the second transistor, the third transistor, and the sixth transistor may be N-type transistors.

In one or more embodiments, the first to sixth transistors may be P-type transistors.

In one or more embodiments, the first write gate signal may be a progressive scan signal, and the first write gate signal, the first initialization gate signal, and the emission signal may be global scan signals.

In one or more embodiments, the second high power voltage may be lower than the first high power voltage.

In one or more embodiments, a display device includes a display panel including a pixel circuit and a display panel driver configured to drive the display panel. The pixel circuit includes a light emitting element, a constant current generation (CCG) circuit configured to generate a fixed driving current based on a CCG data voltage of a data voltage, a second high power voltage, and a low power voltage to provide the fixed driving current to the light emitting element, and a pulse width modulation (PWM) circuit configured to control a generation time of the fixed driving current based on a PWM data voltage of the data voltage, a sweep voltage, a first high power voltage different from the second high power voltage, and a low power voltage. The PWM circuit includes a first transistor including a gate electrode connected to a first node, a first electrode connected to a second node, and a second electrode connected to a third node, a second transistor including a gate electrode configured to receive a first write gate signal, a first electrode configured to receive the data voltage, and a second electrode connected to the second node, and a first capacitor including a first electrode configured to receive a swing voltage and a second electrode connected to the first node. The CCG circuit includes a seventh transistor including a gate electrode connected to a fourth node, a first electrode configured to receive the second high power voltage, and a second electrode connected to a fifth node, an eighth transistor including a gate electrode configured to receive a second write gate signal, a first electrode configured to receive the data voltage, and a second electrode connected to a sixth node, and a second capacitor including a first electrode connected to the sixth node and a second electrode connected to the fourth node.

In one or more embodiments, the CCG circuit may further include a third capacitor including a first electrode configured to receive the second high power voltage and a second electrode connected to the sixth node.

In one or more embodiments, the CCG circuit may further include a ninth transistor including a gate electrode configured to receive a compensation gate signal, a first electrode connected to the fifth node, and a second electrode connected to the fourth node.

In one or more embodiments, an electronic device includes a display device, the display device includes: a display panel including a pixel circuit; and a display panel driver configured to drive the display panel, wherein the pixel circuit includes: a light emitting element; a constant current generation (CCG) circuit configured to generate a fixed driving current based on a CCG data voltage of a data voltage, a second high power voltage, and a low power voltage to provide the fixed driving current to the light emitting element; and a pulse width modulation (PWM) circuit configured to control a generation time of the fixed driving current based on a PWM data voltage of the data voltage, a sweep voltage, a first high power voltage different from the second high power voltage, and a low power voltage, wherein the PWM circuit includes: a first transistor including a gate electrode connected to a first node, a first electrode connected to a second node, and a second electrode connected to a third node; a second transistor including a gate electrode configured to receive a first write gate signal, a first electrode configured to receive the data voltage, and a second electrode connected to the second node; and a first capacitor including a first electrode configured to receive a swing voltage and a second electrode connected to the first node, and wherein the CCG circuit includes: a seventh transistor including a gate electrode connected to a fourth node, a first electrode configured to receive the second high power voltage, and a second electrode connected to a fifth node; and an eighth transistor including a gate electrode configured to receive a second write gate signal, a first electrode configured to receive the data voltage, and a second electrode connected to a sixth node, wherein the electronic device includes a cellular phone, a video phone, a smart pad, a smart phone, a tablet PC, a car navigation system, a computer monitor, a laptop, or a head mounted display (HMD) device.

The second capacitor and the third capacitor are connected in series between a line of the second high power voltage and the fourth node, so that a voltage drop amount (e.g., IR drop amount) of the second high power voltage transmitted to a voltage of the fourth node connected to the gate electrode of the seventh transistor may decrease.

The pixel circuit may include twelve transistors. Since the pixel circuit may include a small number of transistors, the pixel circuit can have a high integration. Therefore, the pixel circuit may be applied to a display device having an ultra-high resolution.

Because the second high power voltage is lower than the first high power supply voltage, a voltage swing range between the second high power voltage and the low power supply voltage may be small. Therefore, a power consumption of the pixel circuit may decrease.

Because the third transistor diode-connects the first transistor, a threshold voltage of the first transistor may be internally compensated.

Because the ninth transistor diode-connects the seventh transistor, a threshold voltage of the seventh transistor may be internally compensated.

The fixed driving current may have a constant amplitude. Therefore, a shift of an wavelength of a light may be prevented. Because the anode of the light emitting element is initialized with the anode initialization voltage, a black margin may be secured.

BRIEF DESCRIPTION OF THE DRAWINGS

The above and other features of embodiments of the present disclosure will become more apparent by describing in detail embodiments thereof with reference to the accompanying drawings, in which.

DETAILED DESCRIPTION

Hereinafter, embodiments of the present disclosure will be described in more detail with reference to the accompanying drawings.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

Figure 1:
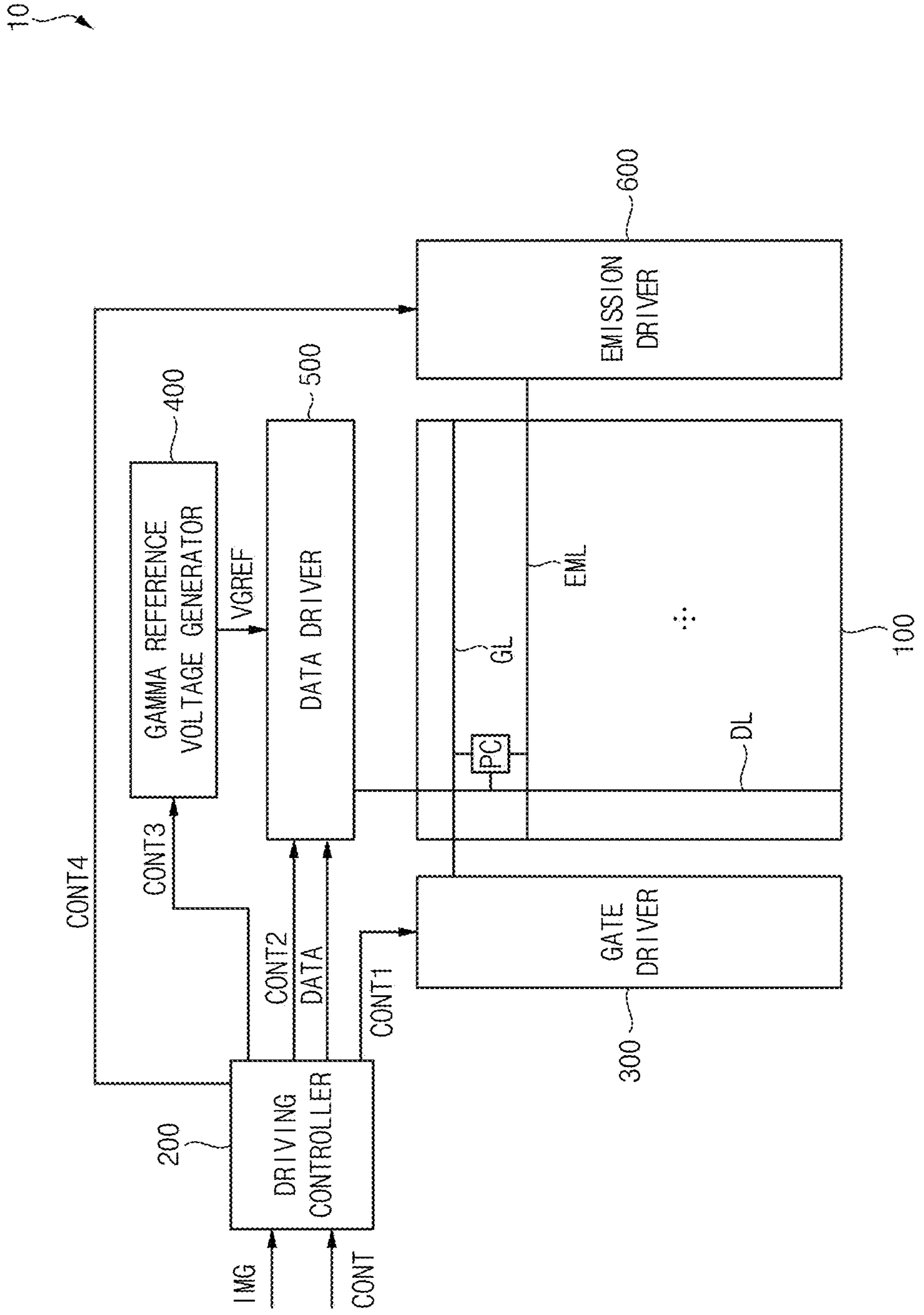
FIG. 1 is a block diagram showing a display device according to one or more embodiments of the present disclosure.

FIG. 1 is a block diagram showing a display device 10 according to one or more embodiments of the present disclosure.

Referring to FIG. 1, a display device 10 may include a display panel 100 and a display panel driver. The display panel driver may include a driving controller 200, a gate driver 300, a gamma reference voltage generator 400, a data driver 500, and an emission driver 600.

The display panel 100 may include a display region for displaying an image and a peripheral region disposed adjacent to the display region.

The display panel 100 may include gate lines GL, data lines DL, emission lines EML and pixel circuits PC electrically connected to the gate lines GL, the data lines DL, and the emission lines EML, respectively. The gate lines GL may extend in a first direction, the data lines DL may extend in a second direction crossing the first direction, and the emission lines EML may extend in the first direction.

The driving controller 200 may receive input image data IMG and an input control signal CONT from an external device. For example, the input image data IMG may include red image data, green image data, and/or blue image data. The input image data IMG may include white image data. The input image data IMG may include magenta image data, yellow image data, and/or cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The gate driver 300 may generate gate signals for driving the gate lines GL in response to the first control signal CONT1 received from the driving controller 200. The gate driver 300 may output the gate signals to the gate lines GL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

For example, the gamma reference voltage generator 400 may be disposed in the driving controller 200 or may be disposed in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

The emission driver 600 may generate emission signals for driving the emission lines EML in response to the fourth control signal CONT4 received from the driving controller 200. The emission driver 600 may output the emission signals to the emission lines EML.

In FIG. 1, for a convenience of an explanation, the gate driver 300 may be disposed on a first side of the display panel 100 and the emission driver 600 may be disposed on a second side of the display panel 100. However, the present disclosure is not limited thereto. For example, both the gate driver 300 and the emission driver 600 may be disposed on the first side of the display panel 100. For example, both the gate driver 300 and the emission driver 600 may be disposed on both sides of the display panel 100. For example, the gate driver 300 and the emission driver 600 may be formed integrally.

Figure 2:
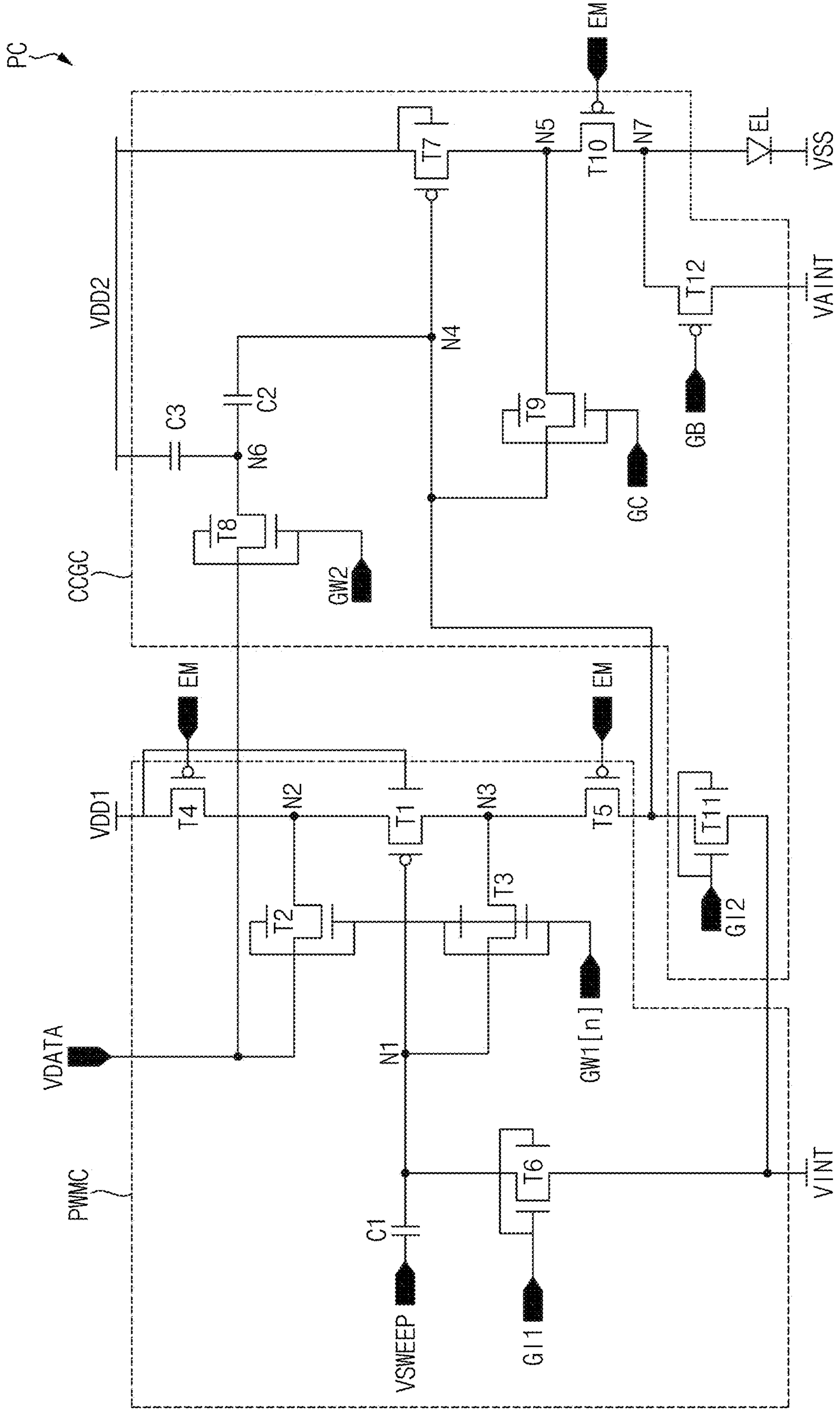
FIG. 2 is a circuit diagram showing an example of a pixel circuit of FIG. 1.

FIG. 2 is a circuit diagram showing an example of a pixel circuit PC of FIG. 1.

Referring to FIGS. 1 and 2, the pixel circuit PC may include a light emitting element EL, a pulse width modulation (PWM) circuit (PWMC), and a constant current generation (CCG) circuit (CCGC).

The pixel circuit PC may drive the light emitting element EL in a PWM method. For example, the CCG circuit CCGC may provide a fixed driving current to the light emitting element EL. For example, the PWM circuit PWMC may control a time at which the fixed driving current is provided to the light emitting element EL (i.e., a generation time of the fixed driving current) to control a light emitting time of the light emitting element EL.

The PWM circuit PWMC may include first to sixth transistors T1 to T6 and a first capacitor C1.

The first transistor T1 may include a gate electrode connected to a first node N1, a first electrode connected to a second node N2, and a second electrode connected to a third node N3. In one or more embodiments, the first transistor T1 may further include a back gate electrode receiving a first high power voltage VDD1.

The second transistor T2 may include a gate electrode receiving a first write gate signal GW1[*n*], a first electrode receiving a data voltage VDATA, and a second electrode connected to the second node N2. In one or more embodiments, the second transistor T2 may further include a back gate electrode connected to the gate electrode of the second transistor T2. In one or more embodiments, the data voltage VDATA may include a reference voltage, a PWM data voltage, and/or a CCG data voltage. The reference voltage and the CCG data voltage may be data voltages for driving the CCG circuit CCGC, and the PWM data voltage may be data voltages for driving the PWM circuit PWMC.

The third transistor T3 may include a gate electrode receiving the first write gate signal GW1[*n*], a first electrode connected to the third node N3, and a second electrode connected to the first node N1. In one or more embodiments, the third transistor T3 may further include a back gate electrode connected to the gate electrode of the third transistor T3.

The fourth transistor T4 may include a gate electrode receiving an emission signal EM, a first electrode receiving the first high power voltage VDD1, and a second electrode connected to the second node N2.

The fifth transistor T5 may include a gate electrode receiving the emission signal EM, a first electrode connected to the third node N3, and a second electrode connected to a fourth node N4.

The sixth transistor T6 may include a gate electrode receiving a first initialization gate signal GI1, a first electrode receiving an initialization voltage VINT, and a second electrode connected to the first node N1. In one or more embodiments, the sixth transistor T6 may further include a back gate electrode connected to the gate electrode of the sixth transistor T6.

The first capacitor C1 may include a first electrode receiving a sweep voltage VSWEEP and a second electrode connected to the first node N1.

The CCG circuit CCGC may include seventh to twelfth transistors T7 to T12, a second capacitor C2, and a third capacitor C3.

The seventh transistor T7 may include a gate electrode connected to the fourth node N4, a first electrode receiving a second high power voltage VDD2, and a second electrode connected to a fifth node N5. In one or more embodiments, the seventh transistor T7 may further include a back gate electrode receiving the second high power voltage VDD2.

The eighth transistor T8 may include a gate electrode receiving a second write gate signal GW2, a first electrode receiving the data voltage VDATA, and a second electrode connected to a sixth node N6. In one or more embodiments, the eighth transistor T8 may further include a back gate electrode connected to the gate electrode of the eighth transistor T8.

The ninth transistor T9 may include a gate electrode receiving a compensation gate signal GC, a first electrode connected to the fifth node N5, and a second electrode connected to the fourth node N4. In one or more embodiments, the ninth transistor T9 may further include a back gate electrode connected to the gate electrode of the ninth transistor T9.

The tenth transistor T10 may include a gate electrode receiving the emission signal EM, a first electrode connected to the fifth node N5, and a second electrode connected to a seventh node N7.

The eleventh transistor T11 may include a gate electrode receiving a second initialization gate signal GI2, a first electrode receiving the initialization voltage VINT, and a second electrode connected to the fourth node N4. In one or more embodiments, the eleventh transistor T11 may further include a back gate electrode connected to the gate electrode of the eleventh transistor T11.

The twelfth transistor T12 may include a gate electrode receiving an anode initialization gate signal GB, a first electrode receiving an anode initialization voltage VAINT, and a second electrode connected to the seventh node N7.

The second capacitor C2 may include a first electrode connected to the sixth node N6 and a second electrode connected to the fourth node N4.

The third capacitor C3 may include a first electrode receiving the second high power voltage VDD2 and a second electrode connected to the sixth node N6.

When the pixel circuit PC is driven, the second high power voltage VDD2 may be voltage-dropped. Because the second capacitor C2 and the third capacitor C3 are connected in series, a voltage drop amount (e.g., IR drop amount) of the second high power voltage VDD2 transmitted to the voltage of the fourth node N4 connected to the gate electrode of the seventh transistor T7 may decrease.

The light emitting element EL may include an anode connected to the seventh node N7 and a cathode receiving a low power voltage VSS. In one or more embodiments, the light emitting element EL may be a micro-light emitting diode (uLED), but the present disclosure is not limited thereto. In another embodiment, the light emitting element EL may be an organic light emitting diode (OLED). In another embodiment, the light emitting element EL may be a nano light emitting diode (NED), a quantum dot (QD) light emitting diode, an inorganic light emitting diode, or any other suitable light emitting element.

The pixel circuit PC may include 12 transistors. Because the pixel circuit PC includes a small number of transistors, the pixel circuit PC may have a high integration. Therefore, the pixel circuit PC may be applied to a display device having an ultra-high resolution.

In one or more embodiments, the first, fourth, fifth, seventh, tenth, and twelfth transistors T1, T4, T5, T7, T10, T12 may be P-type transistors, and the second, third, sixth, eighth, ninth, and eleventh transistors T2, T3, T6, T8, T9, T11 may be N-type transistors. For example, the P-type transistor may be a PMOS transistor, and the N-type transistor may be an NMOS transistor.

The first write gate signal GW1[*n*] may be a progressive scan signal having a different timing for each pixel circuit row. That is, the first write gate signal GW1[*n*] may be sequentially applied to the pixel circuit row. Here, [n] may mean a n-th pixel circuit row.

On the other hand, the emission signal EM, the first initialization gate signal GI1, the second write gate signal GW2, the compensation gate signal GC, the second initialization gate signal GI2, and the anode initialization gate signal GB may be a global scan signal having the same timing regardless of the pixel circuit row. That is, the emission signal EM, the first initialization gate signal GI1, the second write gate signal GW2, the compensation gate signal GC, the second initialization gate signal GI2, and the anode initialization gate signal GB may be concurrently (e.g., simultaneously) applied to the pixel circuit row.

Figure 3:
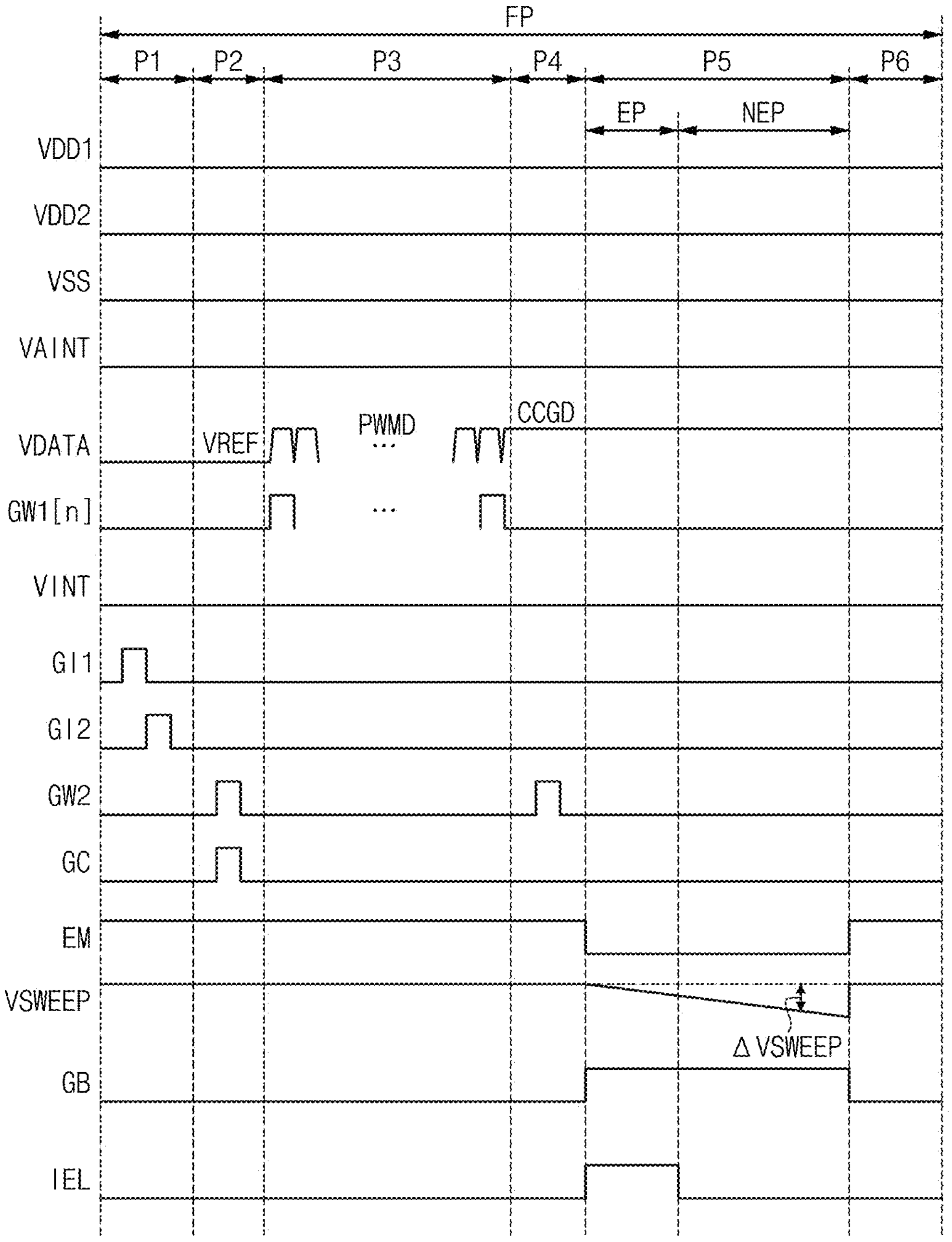
FIG. 3 is a timing diagram showing an example of an operation of the pixel circuit of FIG. 2.

FIG. 3 is a timing diagram showing an example of an operation of the pixel circuit PC of FIG. 2.

Referring to FIGS. 1-3, a frame period FP may include first to sixth periods P1 to P6. The first period P1 may be an initialization period. The second period P2 may be a reference voltage write period and a first threshold voltage compensation period. The third period P3 may be a PWM data voltage write period and a second threshold voltage compensation period. The fourth period P4 may be a CCG data voltage write period. The fifth period P5 may include an emission period EP and a non-emission period NEP. The sixth period P6 may be an anode initialization period.

The first high power voltage VDD1, the second high power voltage VDD2, the low power voltage VSS, the initialization voltage VINT, and the anode initialization voltage VAINT may have constant voltages during the frame period FP. In one or more embodiments, the second high power voltage VDD2 may be different from the first high power voltage VDD1. For example, the second high power voltage VDD2 may be lower than the first high power voltage VDD1. The low power voltage VSS may be lower than the first high power voltage VDD1 and the second high power voltage VDD2. Because the second high power voltage VDD2 is lower than the first high power voltage VDD1, a voltage swing range between the second high power voltage VDD2 and the low power voltage VSS may be small. Therefore, a power consumption of the pixel circuit PC may decrease.

The data voltage VDATA may have the reference voltage VREF in the first period P1 and the second period P2, may have the PWM data voltage PWMD in the third period P3, and may have the CCG data voltage CCGD in the fourth to sixth periods P4 to P6.

In order to express that the first write gate signal GW1[*n*] is the progressive scan signal, the first write gate signal GW1[*n*] is shown as having a plurality of pulses in a timing diagram of FIG. 3. On the other hand, in order to express that the emission signal EM, the first initialization gate signal GI1, the second write gate signal GW2, the compensation gate signal GC, the second initialization gate signal GI2, and the anode initialization gate signal GB are the global scan signals, the emission signal EM, the first initialization gate signal GI1, the second write gate signal GW2, the compensation gate signal GC, the second initialization gate signal GI2, and the anode initialization gate signal GB are shown as having one pulse in the timing diagram of FIG. 3.

The first write gate signal GW1[*n*] may have a pulse having a high level in the third period P3, and may have a low level in a remaining period except for the period having the pulse.

The first initialization gate signal GI1 may have a pulse having the high level in the first period P1, and may have the low level in the remaining period except for the period having the pulse.

The second initialization gate signal GI2 may have a pulse having the high level in the first period P1, and may have the low level in the remaining period except for the period having the pulse.

The second write gate signal GW2 may have a pulse having the high level in the second period P2 and the fourth period P4, and may have the low level in a remaining period except for the period having the pulse.

The compensation gate signal GC may have a pulse having the high level in the second period P2, and may have the low level in a remaining period except for the period having the pulse.

The emission signal EM may have the low level in the fifth period P5 and may have the high level in a remaining period except for the fifth period P5.

The sweep voltage VSWEEP may have the high level in the first to fourth periods P1 to P4, may gradually decrease in the fifth period P5, and may have the high level in the sixth period P6. Here, a change amount in the sweep voltage VSWEEP may be a delta sweep voltage ΔVSWEEP.

The anode initialization gate signal GB may have the high level in the fifth period P5, and may have the low level in a remaining period except for the fifth period P5.

The fixed driving current IEL may be generated in the emission period EP, and may not be generated in a remaining period except for the emission period EP.

Figure 4:
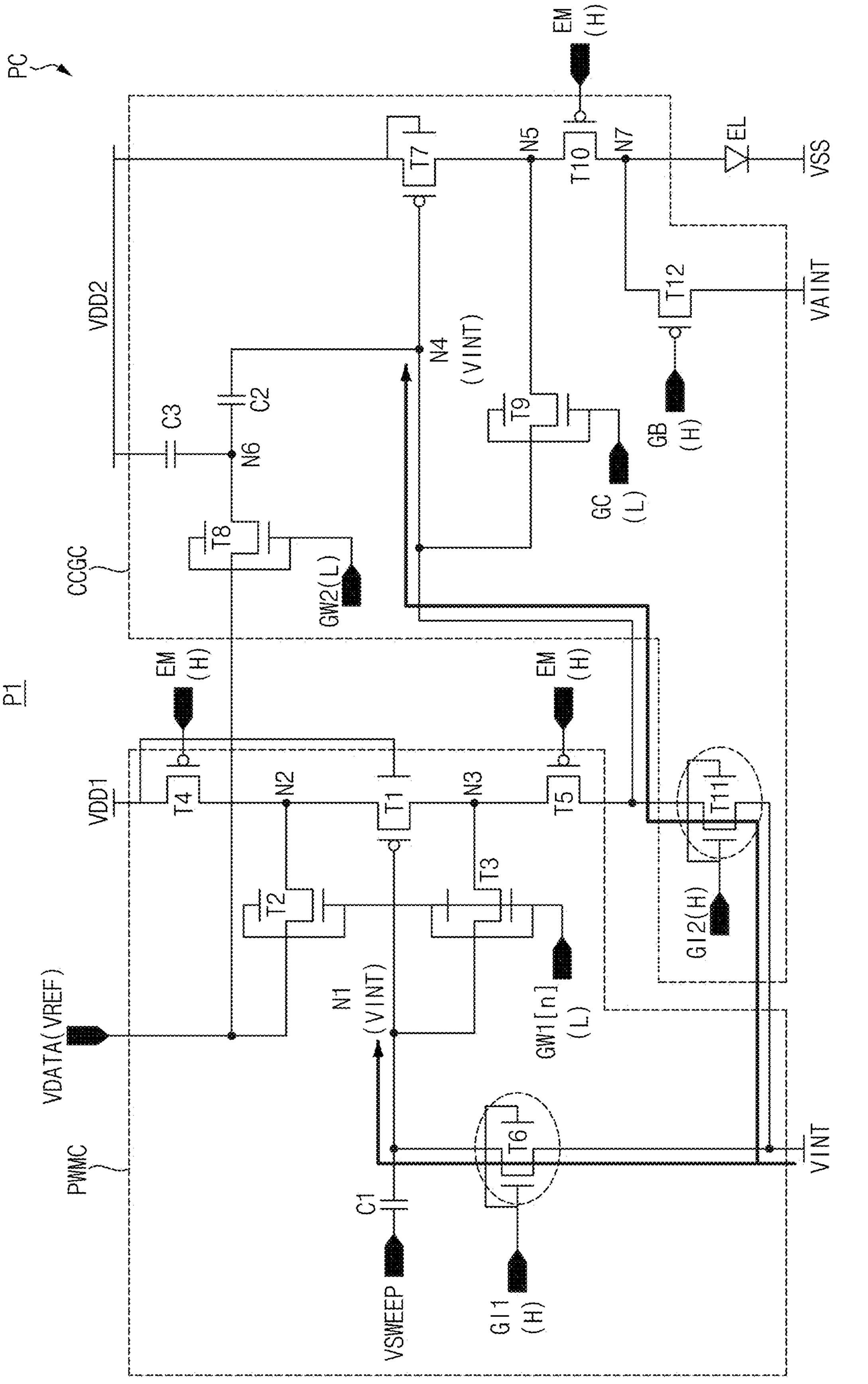
FIG. 4 is a circuit diagram showing an example of an operation of the pixel circuit of FIG. 2 in a first period of FIG. 3.

FIG. 4 is a circuit diagram showing an example of an operation of the pixel circuit PC of FIG. 2 in the first period P1 of FIG. 3.

Referring to FIGS. 1-4, the first period P1 may be the initialization period. In the first period P1, the first initialization gate signal GI1 and the second initialization gate signal GI2 may have the high level H.

The sixth transistor T6 may be turned on in response to the first initialization gate signal GI1 having the high level H to provide the initialization voltage VINT to the first node N1. Therefore, a voltage of the first node N1 may be initialized to the initialization voltage VINT.

The eleventh transistor T11 may be turned on in response to the second initialization gate signal GI2 having the high level H to provide the initialization voltage VINT to the fourth node N4. Therefore, a voltage of the fourth node N4 may be initialized to the initialization voltage VINT.

Figure 5:
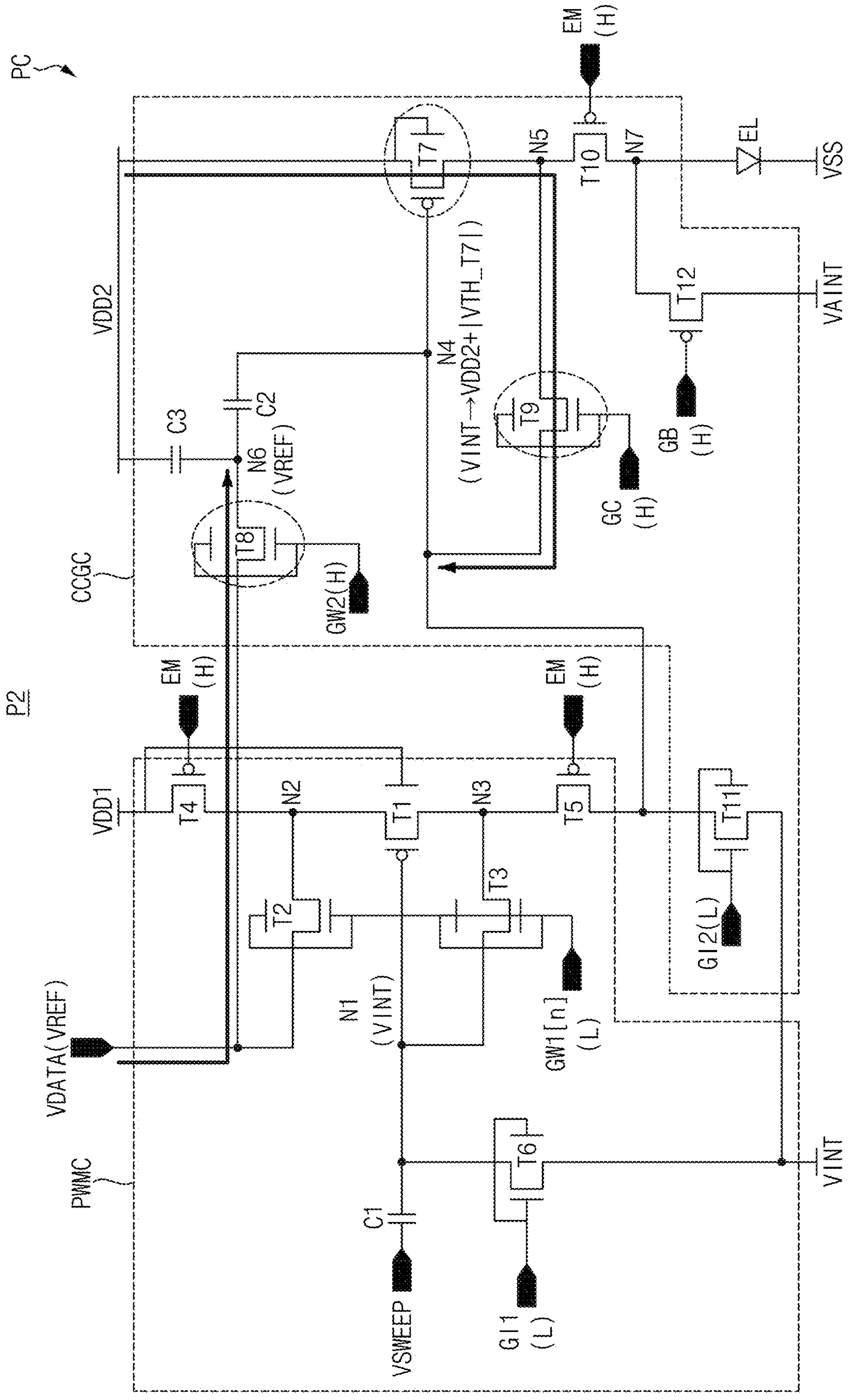
FIG. 5 is a circuit diagram showing an example of an operation of the pixel circuit of FIG. 2 in a second period of FIG. 3.

FIG. 5 is a circuit diagram showing an example of an operation of the pixel circuit PC of FIG. 2 in the second period P2 of FIG. 3.

Referring to FIGS. 1-5, the second period P2 may be the reference voltage write period and the first threshold voltage compensation period. In the second period P2, the second write gate signal GW2 and the compensation gate signal GC may have the high level H, and the data voltage VDATA may have the reference voltage VREF.

The eighth transistor T8 may be turned on in response to the second write gate signal GW2 having the high level H to provide the reference voltage VREF to the sixth node N6. Therefore, a voltage of the sixth node N6 may be the reference voltage VREF.

The seventh transistor T7 may be turned on in response to the voltage of the fourth node N4, which is the initialization voltage VINT, and the second high power voltage VDD2. In addition, the ninth transistor T9 may be turned on in response to the compensation gate signal GC having the high level H to diode-connect the seventh transistor T7. Therefore, the threshold voltage VTH_T7 of the seventh transistor T7 may be internally compensated, and the voltage of the fourth node N4 may be changed to a voltage VDD2+|VTH_T7| obtained by adding an absolute value of a threshold voltage |VTH_T7| of the seventh transistor T7 to the second high power voltage VDD2.

The voltage of the sixth node N6 is the reference voltage VREF, and the voltage of the fourth node N4 is the voltage VDD2+|VTH_T7| obtained by adding the absolute value of the threshold voltage |VTH_T7| of the seventh transistor T7 to the second high power voltage VDD2, so that the second capacitor C2 may be pre-charged.

Figure 6:
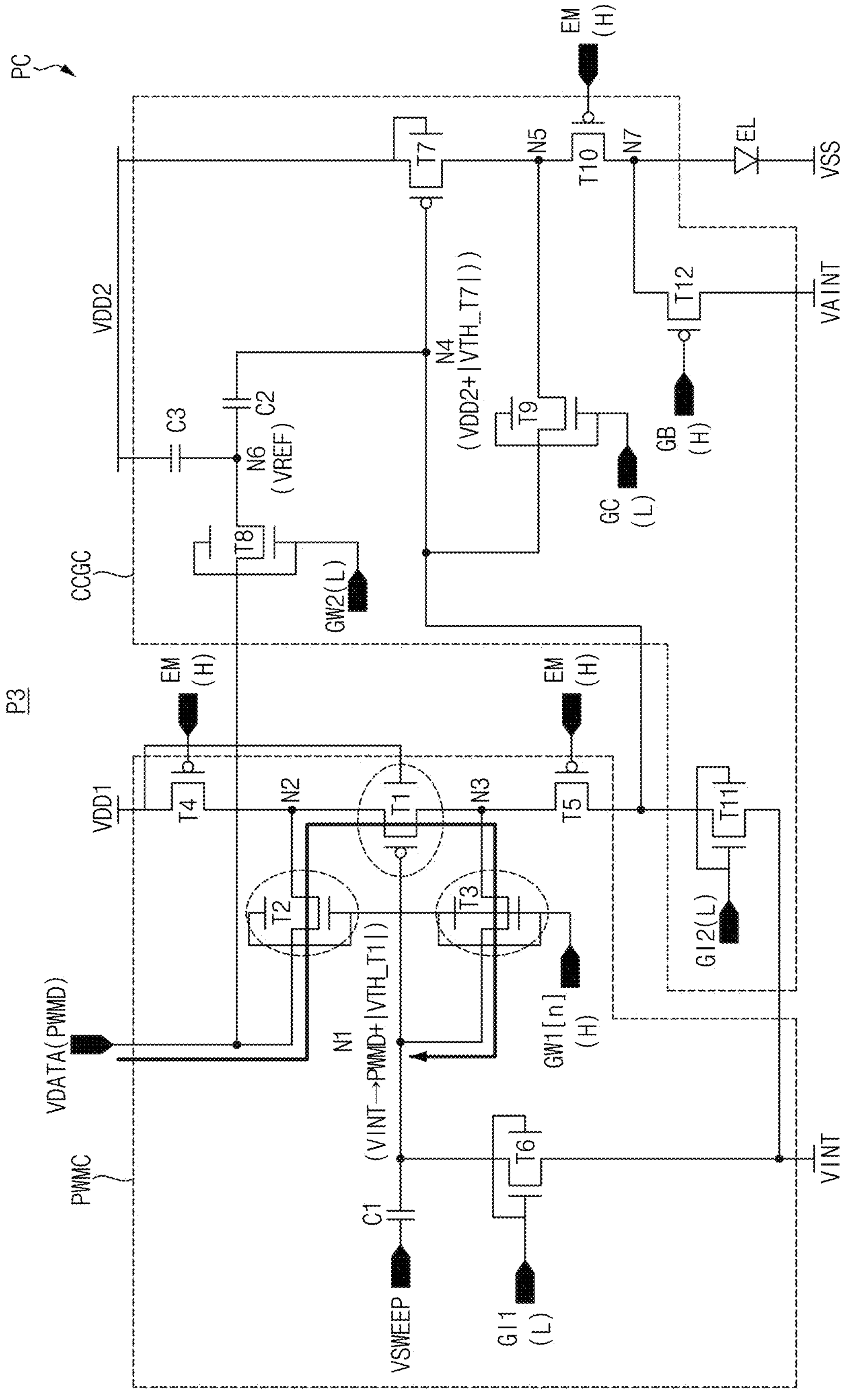
FIG. 6 is a circuit diagram showing an example of an operation of the pixel circuit of FIG. 2 in a third period of FIG. 3.

FIG. 6 is a circuit diagram showing an example of an operation of the pixel circuit PC of FIG. 2 in the third period P3 of FIG. 3.

Referring to FIGS. 1-6, the third period P3 may be the PWM data voltage write period and the second threshold voltage compensation period. In the third period P3, the first write gate signal GW1[*n*] may have the high level H, and the data voltage VDATA may have the PWM data voltage PWMD.

The second transistor T2 may be turned on in response to the first write gate signal GW1[*n*] having the high level H to provide the PWM data voltage PWMD to the second node N2. Therefore, the voltage of the second node N2 may be the PWM data voltage PWMD.

The first transistor T1 may be turned on in response to the voltage of the first node N1 which is the initialization voltage VINT and the voltage of the second node N2 which is the PWM data voltage PWMD. In addition, the third transistor T3 may be turned on in response to the first write gate signal GW1[*n*] having the high level H to diode-connect the first transistor T1. Therefore, a threshold voltage VTH_T1 of the first transistor T1 may be internally compensated, and the voltage of the first node N1 may be changed to a voltage PWMD+|VTH_T1| obtained by adding the absolute value of the threshold voltage |VTH_T1| of the first transistor T1 to the PWM data voltage PWMD.

Because the sweep voltage VSWEEP has the high level H and the voltage of the first node N1 is the voltage PWMD+|VTH_T1| obtained by adding the absolute value of the threshold voltage |VTH_T1| of the first transistor T1 to the PWM data voltage PWMD, the first capacitor C1 may be pre-charged.

Figure 7:
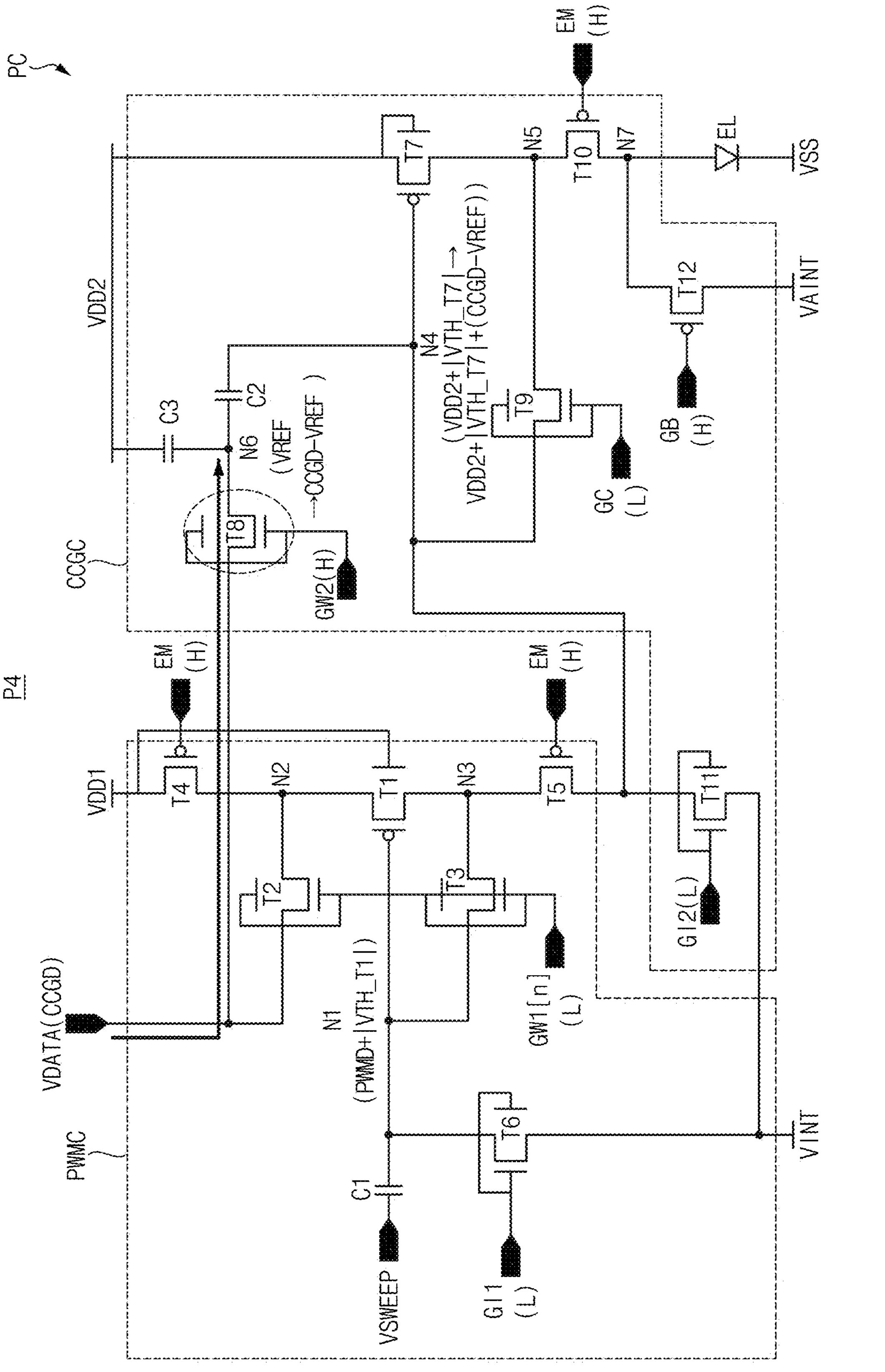
FIG. 7 is a circuit diagram showing an example of an operation of the pixel circuit of FIG. 2 in a fourth period of FIG. 3.

FIG. 7 is a circuit diagram showing an example of an operation of the pixel circuit PC of FIG. 2 in a fourth period P4 of FIG. 3.

Referring to FIGS. 1-7, the fourth period P4 may be a CCG data voltage write period. In the fourth period P4, the second write gate signal GW2 may have the high level H, and the data voltage VDATA may have the CCG data voltage CCGD.

The eighth transistor T8 may be turned on in response to the second write gate signal GW2 having the high level H to provide the CCG data voltage CCGD to the sixth node N6. Therefore, the voltage of the sixth node N6 may be changed from the reference voltage VREF to the CCG data voltage CCGD by "CCGD-VREF".

Accordingly, while the pre-charged voltage is maintained at the second capacitor C2, the voltage of the fourth node N4 may be changed from "VDD2+|VTH_T7|" to "CCGD−VREF" and be bootstrapped to "VDD2+|VTH_T7|+(CCGD−VREF)".

Figure 8:
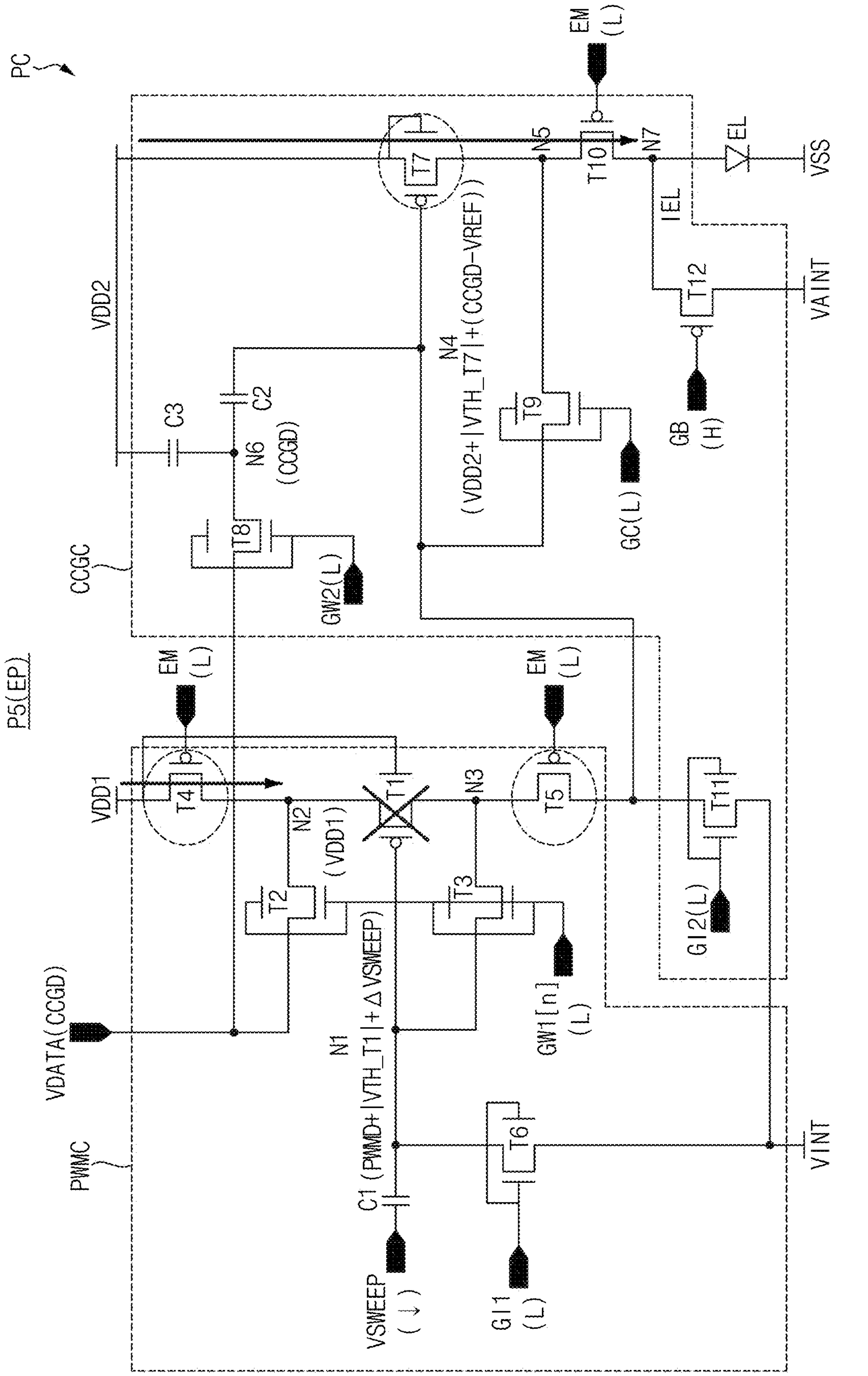
FIG. 8 is a circuit diagram showing an example of an operation of the pixel circuit of FIG. 2 in an emission period of a fifth period of FIG. 3.
Figure 9:
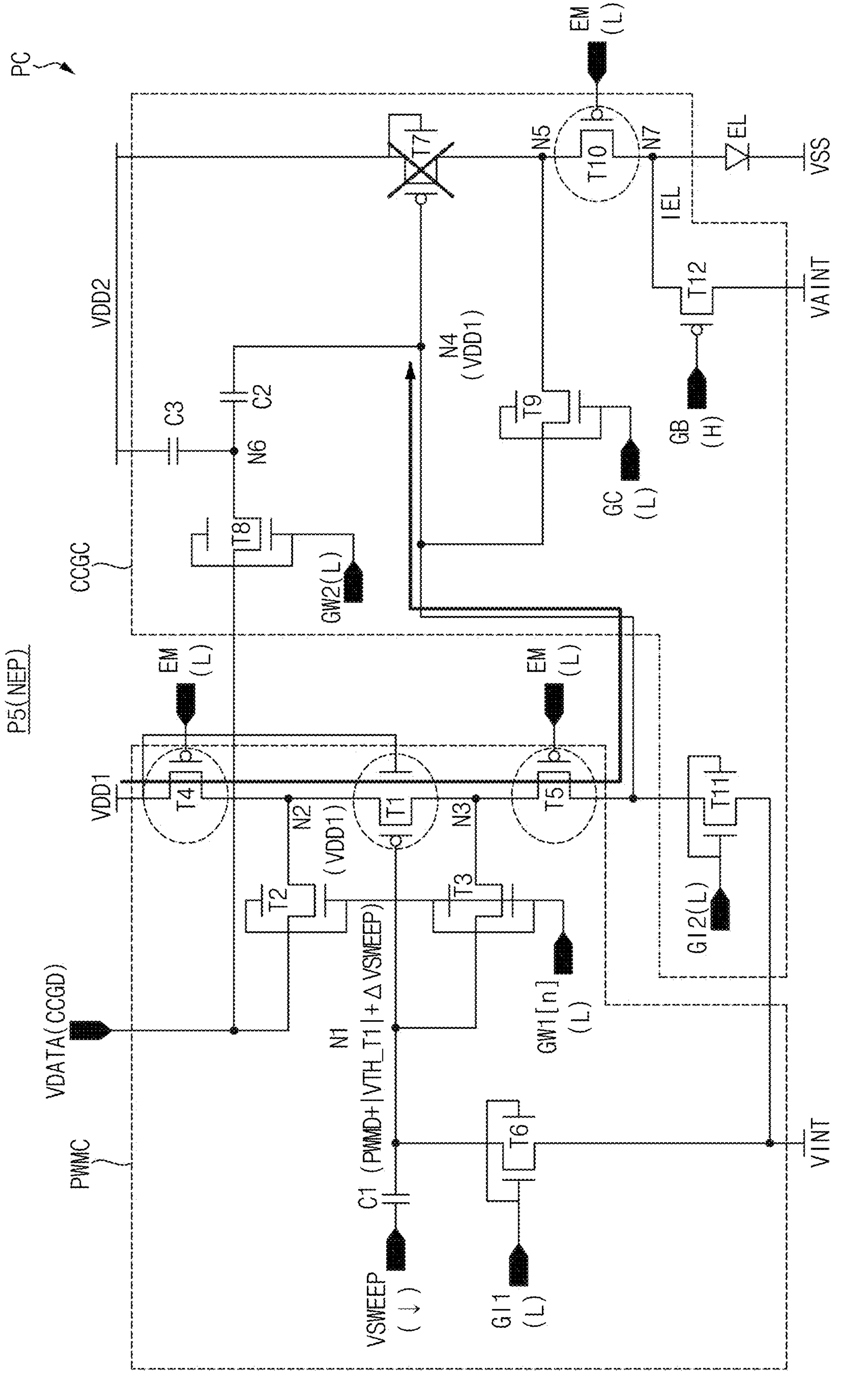
FIG. 9 is a circuit diagram showing an example of an operation of the pixel circuit of FIG. 2 in a non-emission period of a fifth period of FIG. 3.

FIG. 8 is a circuit diagram showing an example of an operation of the pixel circuit PC of FIG. 2 in the emission period EP of the fifth period P5 of FIG. 3. FIG. 9 is a circuit diagram showing an example of an operation of the pixel circuit PC of FIG. 2 in the non-emission period NEP of the fifth period P5 of FIG. 3.

Referring to FIGS. 1-9, the fifth period P5 may include the emission period EP and the non-emission period NEP. In the emission period EP and the non-emission period NEP, the emission signal EM may have the low level L, and the sweep voltage VSWEEP may gradually decrease. The change amount in the sweep voltage VSWEEP may be the delta sweep voltage ΔVSWEEP.

The seventh transistor T7 may generate the fixed driving current IEL based on the voltage of the fourth node N4 and the second high power voltage VDD2. The tenth transistor T10 may be turned on in response to the emission signal EM having the low level L to provide the fixed driving current IEL to the light emitting element EL. The fixed driving current IEL may have a constant amplitude. Therefore, a shift of a wavelength of a light may be prevented.

The light emitting element EL may emit the light based on the fixed driving current IEL. A luminance of the light emitting element EL may be determined based on a time during which the fixed driving current IEL is provided to the light emitting element EL. That is, the luminance of the light emitting element EL may be determined based on a pulse width of the fixed driving current IEL. Here, the pulse width of the fixed driving current IEL may be adjusted based on a level of the PWM data voltage PWMD. That is, the light emitting element EL may be driven in a PWM method.

The fourth transistor T4 may be turned on in response to the emission signal EM having the low level L to provide the first high power voltage VDD1 to the second node N2. Therefore, the voltage of the second node N2 may be the first high power voltage VDD1.

The first transistor T1 may be turned on based on the voltage of the first node N1 and the voltage of the second node N2. The voltage of the second node N2 may be the first high power voltage VDD1. Therefore, when the voltage of the first node N1 is higher than the voltage VDD1−|VTH_T1| obtained by subtracting the absolute value of the threshold voltage |VTH_T1| of the first transistor T1 from the first high power voltage VDD1, the first transistor T1 may be turned off. In addition, when the voltage of the first node N1 is lower than or equal to the voltage VDD1−|VTH_T1| obtained by subtracting the absolute value of the threshold voltage |VTH_T1| of the first transistor T1 from the first high power voltage VDD1, the first transistor T1 may be turned on.

In the emission period EP and the non-emission period NEP, the sweep voltage VSWEEP may be changed from the high level H by the delta sweep voltage ΔVSWEEP. Therefore, while the pre-charged voltage is maintained on the first capacitor C1, the voltage of the first node N1 may be changed from "PWMD+|VTH_T1|" by the delta sweep voltage ΔVSWEEP and may be bootstrapped to "PWMD+|VTH_T1|+ΔVSWEEP".

In the emission period EP, the voltage of the first node N1 may be higher than "VDD1−|VTH_T1|". Therefore, the first transistor T1 may be turned off. Accordingly, even if the fifth transistor T5 is turned on in response to the emission signal EM having the low level L, the first high power voltage VDD1 may not be applied to the fourth node N4 along a path of the fourth transistor T4, the first transistor T1, and the fifth transistor T5. Therefore, the seventh transistor T7 may be maintained in a turn-on state, the fixed driving current IEL may be applied to the light emitting element EL, and the light emitting element EL may emit the light.

On the other hand, in the non-emission period NEP, the voltage of the first node N1 may be lower than or equal to "VDD1−|VTH_T1|". Therefore, the first transistor T1 may be turned on. Accordingly, the first high power voltage VDD1 may be applied to the fourth node N4 along the path of the fourth transistor T4, the first transistor T1, and the fifth transistor T5. Therefore, the voltage of the fourth node N4 may be the first high power voltage VDD1, the seventh transistor T7 may be turned off, the fixed driving current IEL may not be applied to the light emitting element EL, and the light emitting element EL may not emit the light.

Figure 10:
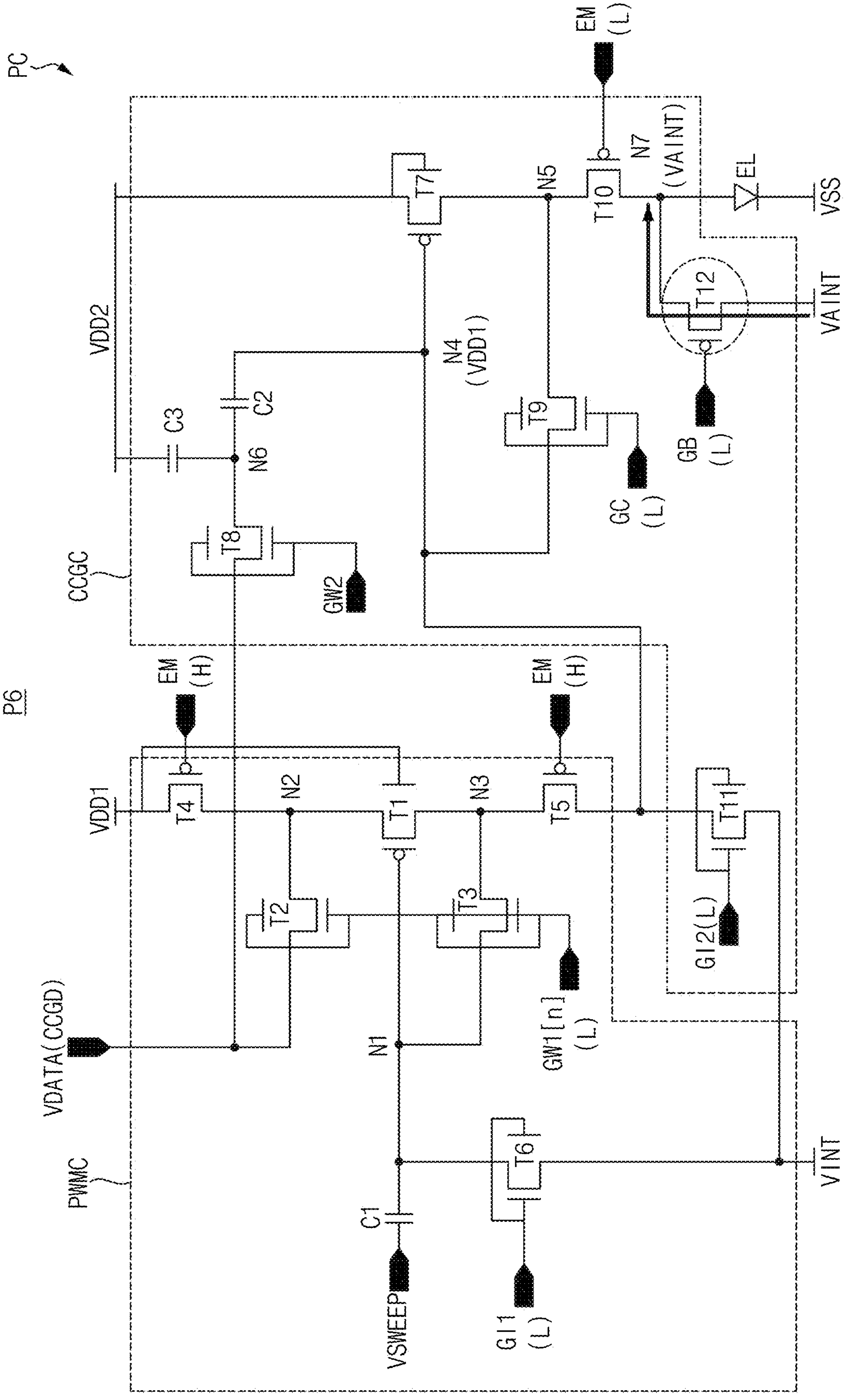
FIG. 10 is a circuit diagram showing an example of an operation of the pixel circuit of FIG. 2 in a sixth period of FIG. 3.

FIG. 10 is a circuit diagram showing an example of an operation of the pixel circuit PC of FIG. 2 in the sixth period P6 of FIG. 3.

Referring to FIGS. 1-10, the sixth period P6 may be the anode initialization period. In the sixth period P6, the anode initialization gate signal GB may have the low level L.

The twelfth transistor T12 may be turned on in response to the anode initialization gate signal GB having the low level L to provide the anode initialization voltage VAINT to the seventh node N7. A voltage of the seventh node N7 may be initialized to the anode initialization voltage VAINT. Because the anode of the light emitting element EL is initialized to the anode initialization voltage VAINT, a black margin may be secured.

As such, the second capacitor C2 and the third capacitor C3 may be connected in series between a line of the second high power voltage VDD2 and the fourth node N4, so that the voltage drop amount (e.g., the IR drop amount) of the second high power voltage VDD2 transmitted to the voltage of the fourth node N4 connected to the gate electrode of the seventh transistor T7 may be reduced.

The pixel circuit PC may include 12 transistors. Because the pixel circuit PC includes a small number of transistors, the pixel circuit PC may have high integration (e.g., highly integrated). Therefore, the pixel circuit PC may be applied to the display device having the ultra-high resolution.

Because the second high power voltage VDD2 is lower than the first high power voltage VDD1, the voltage swing range between the second high power voltage VDD2 and the low power voltage VSS may be small. Therefore, the power consumption of the pixel circuit PC may decrease.

Because the third transistor T3 diode-connects the first transistor T1, the threshold voltage VTH_T1 of the first transistor T1 may be internally compensated.

Because the ninth transistor T9 diode-connects the seventh transistor T7, the threshold voltage VTH_T7 of the seventh transistor T7 may be internally compensated.

The fixed driving current IEL may have a constant amplitude. Therefore, the shift of the wavelength of light may be prevented.

Because the anode of the light emitting element EL is initialized with the anode initialization voltage VAINT, the black margin may be secured.

Figure 11:
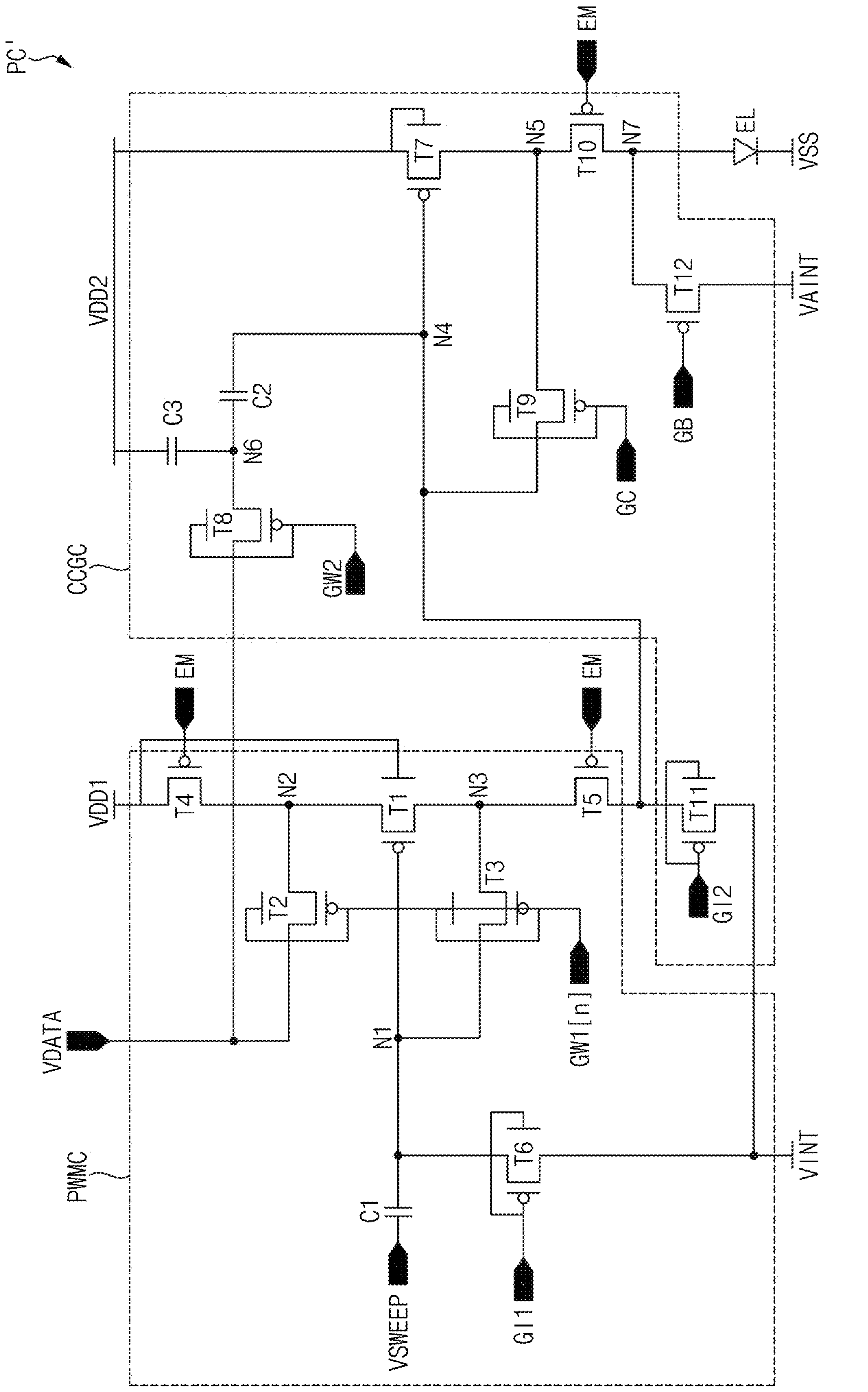
FIG. 11 is a circuit diagram showing an example of a pixel circuit of FIG. 1.

FIG. 11 is a circuit diagram showing an example pixel circuit PC' of FIG. 1.

Referring to FIGS. 1-11, the pixel circuit PC' may include a light emitting element EL, a PWM circuit PWMC, and a CCG circuit CCGC.

The pixel circuit PC' may drive the light emitting element EL in a PWM method. For example, the CCG circuit CCGC may provide a fixed driving current to the light emitting element EL. For example, the PWM circuit PWMC may control a time at which the fixed driving current is provided to the light emitting element EL (i.e., a generation time of the fixed driving current) to control a light emitting time of the light emitting element EL.

The PWM circuit PWMC may include first to sixth transistors T1 to T6 and a first capacitor C1. The CCG circuit CCGC may include seventh to twelfth transistors T11 to T12, a second capacitor C2, and a third capacitor C3.

The pixel circuit PC' of FIG. 11 is substantially equal to the pixel circuit PC of FIG. 2, except that the first to twelfth transistors T1 to T12 are P-type transistors. Therefore, the same reference numerals are used for the same or similar components, and redundant descriptions are omitted.

Figure 12:
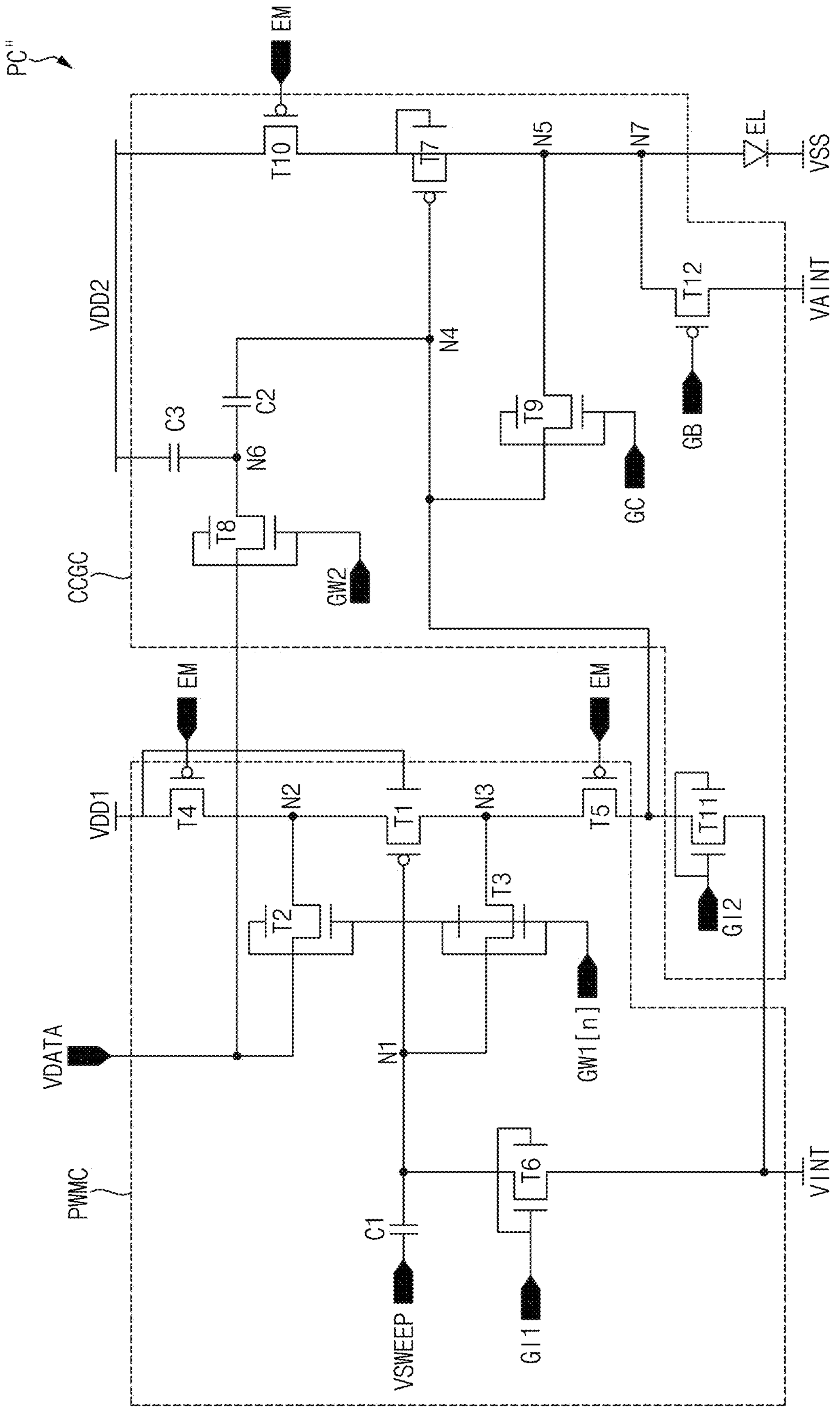
FIG. 12 is a circuit diagram showing an example of a pixel circuit of FIG. 1.

FIG. 12 is a circuit diagram showing an example pixel circuit PC" of FIG. 1.

Referring to FIGS. 1-12, the pixel circuit PC" may include a light emitting element EL, a PWM circuit PWMC, and a CCG circuit CCGC.

The pixel circuit PC' may drive the light emitting element EL in a PWM method. For example, the CCG circuit CCGC may provide a fixed driving current to the light emitting element EL. For example, the PWM circuit PWMC may control a time at which the fixed driving current is provided to the light emitting element EL (i.e., a generation time of the fixed driving current) to control a light emitting time of the light emitting element EL.

The PWM circuit PWMC may include first to sixth transistors T1 to T6 and a first capacitor C1. The CCG circuit CCGC may include seventh to twelfth transistors T11 to T12, a second capacitor C2, and a third capacitor C3.

The pixel circuit PC" of FIG. 12 is substantially equal to the pixel circuit PC of FIG. 2, except for a connection relationship of the tenth transistor T10. The tenth transistor T10 of FIG. 12 may include a gate electrode receiving an emission signal EM, a first electrode receiving a second high power voltage VDD2, and a second electrode connected to a first electrode of the seventh transistor T7. Therefore, the same reference numbers are used for identical or similar components, and redundant descriptions are omitted.

Figure 13:
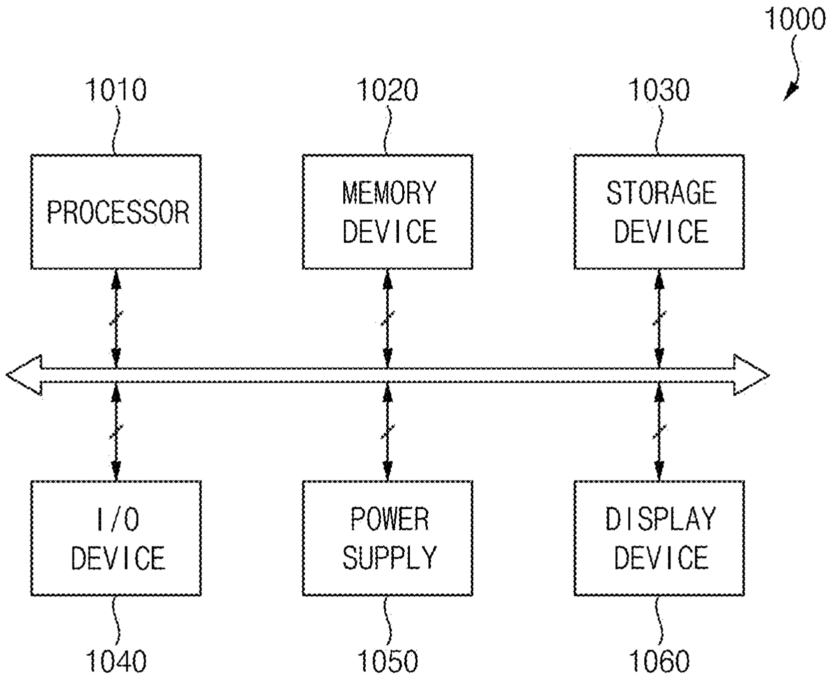
FIG. 13 is a block diagram showing an electronic device.
Figure 14:
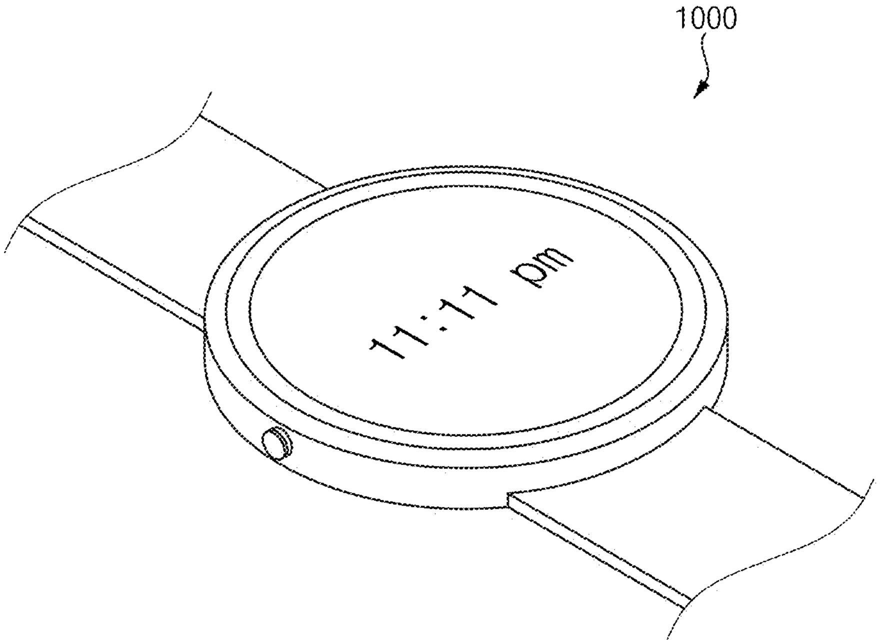
FIG. 14 is a diagram in which an electronic device of FIG. 13 is implemented as a smart watch.

FIG. 13 is a block diagram showing an electronic device 1000. FIG. 14 is a diagram showing an embodiment in which the electronic device 1000 of FIG. 13 is implemented as a smart watch.

Referring to FIGS. 13 and 14, the electronic device 1000 may include a processor 1010, a memory device 1020, a storage device 1030, an input/output I/O device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, and/or the like.

In one or more embodiments, as illustrated in FIG. 14, the electronic device 1000 may be implemented as a smart watch. However, the electronic device 1000 is not limited thereto. For example, the electronic device 1000 may be implemented as a cellular phone, a video phone, a smart pad, a smart phone, a tablet PC, a car navigation system, a computer monitor, a laptop, a head mounted display (HMD) device, and/or the like.

The processor 1010 may perform various computing functions. The processor 1010 may be a microprocessor, a central processing unit (CPU), an application processor (AP), and/or the like. The processor 1010 may be coupled to other components via an address bus, a control bus, a data bus, and/or the like. Further, the processor 1010 may be coupled to an extended bus such as a peripheral component interconnection (PCI) bus.

The memory device 1020 may store data for operations of the electronic device 1000. For example, the memory device 1020 may include at least one nonvolatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and/or the like and/or at least one volatile memory device such as a dynamic random access memory DRAM device, a static random access memory SRAM device, a mobile DRAM device, and/or the like.

The storage device 1030 may include a solid state drive (SSD) device, a hard disk drive (HDD) device, a CD-ROM device, and/or the like.

The I/O device 1040 may include an input device such as a keyboard, a keypad, a mouse device, a touch-pad, a touch-screen, and/or the like, and an output device such as a printer, a speaker, and the like. In one or more embodiments, the I/O device 1040 may include the display device 1060.

The power supply 1050 may provide power for operations of the electronic device 1000.

The display device 1060 may be connected to other components through buses or other communication links.

The present disclosure may be applied to any display device and any electronic device including the touch panel. For example, the present disclosure may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the present disclosure and is not to be construed as limiting thereof. Although a few embodiments of the present disclosure have been described, those skilled in the art will readily appreciate that many modifications are possible in the embodiments without materially departing from the novel teachings and features of the present disclosure. Accordingly, all such modifications are intended to be included within the scope of the present disclosure as defined in the claims and their equivalents. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims and their equivalents. The present disclosure is defined by the following claims, with equivalents of the claims to be included therein.

What is claimed is:

1. A pixel circuit comprising:

a light emitting element;

a constant current generation (CCG) circuit configured to generate a fixed driving current based on a CCG data voltage of a data voltage, a second high power voltage, and a low power voltage to provide the fixed driving current to the light emitting element; and a pulse width modulation (PWM) circuit configured to control a generation time of the fixed driving current based on a PWM data voltage of the data voltage, a sweep voltage, and a first high power voltage different from the second high power voltage, wherein the PWM circuit comprises:

a first transistor comprising a gate electrode connected to a first node, a first electrode connected to a second node, and a second electrode connected to a third node;

a second transistor comprising a gate electrode configured to receive a first write gate signal, a first electrode configured to receive the data voltage, and a second electrode connected to the second node;

a fifth transistor comprising a gate electrode configured to receive an emission signal, a first electrode connected to the third node, and a second electrode connected to a fourth node; and a first capacitor comprising a first electrode configured to receive a swing voltage and a second electrode connected to the first node, wherein the CCG circuit comprises:

a seventh transistor comprising a gate electrode connected to the fourth node, a first electrode configured to receive the second high power voltage, and a second electrode connected to a fifth node;

an eighth transistor comprising a gate electrode configured to receive a second write gate signal, a first electrode configured to receive the data voltage, and a second electrode connected to a sixth node;

a ninth transistor comprising a gate electrode configured to receive a compensation gate signal, a first electrode connected to the fifth node, and a second electrode connected to the fourth node;

a second capacitor comprising a first electrode connected to the sixth node and a second electrode connected to the fourth node, and a third capacitor comprising a first electrode configured to receive the second high power voltage and a second electrode connected to the sixth node, wherein the first electrode of the second transistor and the first electrode of the eighth transistor are connected to each other, and wherein the second electrode of the fifth transistor and the second electrode of the ninth transistor are directly connected to each other.

2. The pixel circuit of claim 1, wherein the CCG circuit further comprises:

an eleventh transistor comprising a gate electrode configured to receive a second initialization gate signal, a first electrode configured to receive an initialization voltage, and a second electrode connected to the fourth node.

3. The pixel circuit of claim 2, wherein the light emitting element comprises an anode connected to the CCG circuit and a cathode configured to receive the low power voltage, and wherein the CCG circuit further comprises:

a twelfth transistor comprising a gate electrode configured to receive an anode initialization gate signal, a first electrode configured to receive an anode initialization voltage, and a second electrode connected to the anode of the light emitting element.

4. The pixel circuit of claim 3, wherein the seventh transistor and the twelfth transistor are P-type transistors, and the eighth transistor, the ninth transistor, and the eleventh transistor are N-type transistors.

5. The pixel circuit of claim 3, wherein the seventh to ninth transistors, the eleventh transistor, and the twelfth transistor are P-type transistors.

6. The pixel circuit of claim 3, wherein the compensation gate signal, the second write gate signal, and the second initialization gate signal are global scan signals.

7. The pixel circuit of claim 3, wherein the CCG circuit further comprises:
- a tenth transistor connected between the fifth node and the anode of the light emitting element and configured to be turned on in response to the emission signal.

8. The pixel circuit of claim 3, wherein the CCG circuit further comprises:
- a tenth transistor configured to receive the second high power voltage and connected to the first electrode of the seventh transistor, and configured to turn on in response to the emission signal.

9. The pixel circuit of claim 1, wherein the PWM circuit further comprises:
- a third transistor comprising a gate electrode configured to receive the first write gate signal, a first electrode connected to the third node, and a second electrode connected to the first node.

10. The pixel circuit of claim 9, wherein the PWM circuit further comprises:
- a sixth transistor comprising a gate electrode configured to receive a first initialization gate signal, a first electrode configured to receive an initialization voltage, and a second electrode connected to the first node.

11. The pixel circuit of claim 10, wherein the PWM circuit further comprises:
- a fourth transistor comprising a gate electrode configured to receive the emission signal, a first electrode configured to receive the first high power voltage, and a second electrode connected to the second node.

12. The pixel circuit of claim 11, wherein the first transistor, the fourth transistor, and the fifth transistor are P-type transistors, and the second transistor, the third transistor, and the sixth transistor are N-type transistors.

13. The pixel circuit of claim 11, wherein the first to sixth transistors are P-type transistors.

14. The pixel circuit of claim 11, wherein the first write gate signal is a progressive scan signal, and the first write gate signal, the first initialization gate signal, and the emission signal are global scan signals.

15. The pixel circuit of claim 1, wherein the second high power voltage is lower than the first high power voltage.

16. A display device comprising:
- a display panel comprising a pixel circuit; and
- a display panel driver configured to drive the display panel,
- wherein the pixel circuit comprises:
  - a light emitting element;
  - a constant current generation (CCG) circuit configured to generate a fixed driving current based on a CCG data voltage of a data voltage, a second high power voltage, and a low power voltage to provide the fixed driving current to the light emitting element; and
  - a pulse width modulation (PWM) circuit configured to control a generation time of the fixed driving current based on a PWM data voltage of the data voltage, a sweep voltage, and a first high power voltage different from the second high power voltage,
- wherein the PWM circuit comprises:
  - a first transistor comprising a gate electrode connected to a first node, a first electrode connected to a second node, and a second electrode connected to a third node;
  - a second transistor comprising a gate electrode configured to receive a first write gate signal, a first electrode configured to receive the data voltage, and a second electrode connected to the second node;
  - a fifth transistor comprising a gate electrode configured to receive an emission signal, a first electrode connected to the third node, and a second electrode connected to a fourth node; and
  - a first capacitor comprising a first electrode configured to receive a swing voltage and a second electrode connected to the first node,
- wherein the CCG circuit comprises:
  - a seventh transistor comprising a gate electrode connected to the fourth node, a first electrode configured to receive the second high power voltage, and a second electrode connected to a fifth node;
  - an eighth transistor comprising a gate electrode configured to receive a second write gate signal, a first electrode configured to receive the data voltage, and a second electrode connected to a sixth node;
  - a ninth transistor comprising a gate electrode configured to receive a compensation gate signal, a first electrode connected to the fifth node, and a second electrode connected to the fourth node;
  - a second capacitor comprising a first electrode connected to the sixth node and a second electrode connected to the fourth node, and
  - a third capacitor comprising a first electrode configured to receive the second high power voltage and a second electrode connected to the sixth node,
- wherein the first electrode of the second transistor and the first electrode of the eighth transistor are connected to each other, and
- wherein the second electrode of the fifth transistor and the second electrode of the ninth transistor are directly connected to each other.

17. An electronic device comprising a display device, the display device comprising:
- a display panel comprising a pixel circuit; and
- a display panel driver configured to drive the display panel,
- wherein the pixel circuit comprises:
  - a light emitting element;
  - a constant current generation (CCG) circuit configured to generate a fixed driving current based on a CCG data voltage of a data voltage, a second high power voltage, and a low power voltage to provide the fixed driving current to the light emitting element; and
  - a pulse width modulation (PWM) circuit configured to control a generation time of the fixed driving current based on a PWM data voltage of the data voltage, a sweep voltage, and a first high power voltage different from the second high power voltage,
- wherein the PWM circuit comprises:
  - a first transistor comprising a gate electrode connected to a first node, a first electrode connected to a second node, and a second electrode connected to a third node;

a second transistor comprising a gate electrode configured to receive a first write gate signal, a first electrode configured to receive the data voltage, and a second electrode connected to the second node;

a fifth transistor comprising a gate electrode configured to receive an emission signal, a first electrode connected to the third node, and a second electrode connected to a fourth node; and a first capacitor comprising a first electrode configured to receive a swing voltage and a second electrode connected to the first node, wherein the CCG circuit comprises:

a seventh transistor comprising a gate electrode connected to the fourth node, a first electrode configured to receive the second high power voltage, and a second electrode connected to a fifth node;

an eighth transistor comprising a gate electrode configured to receive a second write gate signal, a first electrode configured to receive the data voltage, and a second electrode connected to a sixth node;

a ninth transistor comprising a gate electrode configured to receive a compensation gate signal, a first electrode connected to the fifth node, and a second electrode connected to the fourth node;

a second capacitor comprising a first electrode connected to the sixth node and a second electrode connected to the fourth node; and a third capacitor comprising a first electrode configured to receive the second high power voltage and a second electrode connected to the sixth node, wherein the first electrode of the second transistor and the first electrode of the eighth transistor are connected to each other, and wherein the second electrode of the fifth transistor and the second electrode of the ninth transistor are directly connected to each other.

18. The electronic device of claim 17, wherein the electronic device comprises a cellular phone, a video phone, a smart pad, a smart phone, a tablet PC, a car navigation system, a computer monitor, a laptop, or a head mounted display (HMD) device.

* * * * *